(12) United States Patent
Lee

(10) Patent No.: US 9,702,452 B2
(45) Date of Patent: Jul. 11, 2017

(54) APPARATUS FOR PREVENTING WRONG GEAR SHIFT OF MANUAL TRANSMISSION

(71) Applicant: Hyundai Motor Company, Seoul (KR)

(72) Inventor: Kyung Woo Lee, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 258 days.

(21) Appl. No.: 14/515,014

(22) Filed: Oct. 15, 2014

(65) Prior Publication Data

US 2015/0114159 A1 Apr. 30, 2015

(30) Foreign Application Priority Data

Oct. 29, 2013 (KR) .................... 10-2013-0129288

(51) Int. Cl.
*F16H 59/04* (2006.01)
*F16H 61/18* (2006.01)
*F16H 63/34* (2006.01)

(52) U.S. Cl.
CPC ............ *F16H 59/04* (2013.01); *F16H 61/18* (2013.01); *F16H 63/34* (2013.01); *Y10T 74/2011* (2015.01)

(58) Field of Classification Search
CPC ........................ F16H 61/18; F16H 2061/185
See application file for complete search history.

(56) References Cited

U.S. PATENT DOCUMENTS

| 1,938,796 | A | * | 12/1933 | Bernard | ................. F16H 61/18 74/473.21 |
| 2008/0245174 | A1 | | 10/2008 | Fischer et al. | |
| 2015/0167841 | A1 | * | 6/2015 | Lee | ........................ F16H 63/20 74/473.36 |

FOREIGN PATENT DOCUMENTS

| DE | 102012214084 A1 * | 2/2014 | ............. F16H 63/34 |
| JP | 2002-340184 A | 11/2002 | |
| JP | 2009-281574 A | 12/2009 | |
| KR | 1998-047235 A | 9/1998 | |
| KR | 2001-0111882 A | 12/2001 | |
| KR | 10-2002-0083790 A | 11/2002 | |
| KR | 2003-0092518 A | 12/2003 | |

* cited by examiner

Primary Examiner — Terence Boes
(74) Attorney, Agent, or Firm — Morgan Lewis & Bockius LLP

(57) ABSTRACT

An apparatus for preventing wrong shift operation of a manual transmission may include a control shaft provided in a housing of a transmission and connected to a shift lever, a stopper lever linked with the control shaft and rotated together with the control shaft, and a stopper unit arranged on a rotational radius of the stopper lever inside the transmission, and provided with a plate arranged rotatably in an axial direction of the control shaft such that the stopper lever that is rotated during a select operation for shifting to a highest speed step is caught by the plate to limit rotation of the stopper lever and the plate is rotated by the stopper lever when a shift operation is performed at a shift step preceding the highest speed step to progress the select operation to the highest speed step.

7 Claims, 4 Drawing Sheets

APPARATUS FOR PREVENTING WRONG GEAR SHIFT OF MANUAL TRANSMISSION

CROSS REFERENCE TO RELATED APPLICATION

The present application claims priority to Korean Patent Application Number 10-2013-0129288 filed Oct. 29, 2013, the entire contents of which is incorporated herein for all purposes by this reference.

BACKGROUND OF THE INVENTION

Field of the Invention

The present invention relates to an apparatus for preventing wrong shift operation of a manual transmission through which gears are shifted to 5th step, or 6th and 7th step or more to ensure a stable manipulation property without confusion when shifting gears in a manual transmission with 7 speeds or more to ensure a stable manipulation property.

Description of Related Art

Generally, a manual transmission is arranged between a clutch and a propulsion shaft and is provided for properly shifting driving power of an engine depending on a driving state of a vehicle, and a shift lever is arranged on an interior of a vehicle in which a manual transmission is mounted such that a driver shifts gears.

The shift lever arranged on the interior of a vehicle and a shift manipulation unit arranged on a transmission side are connected through cables in the manual transmission in which a shift cable and a select cable are operated respectively to operate the shift manipulation unit when a driver manipulates the shift lever, thereby shifting gears.

Recently, a manual transmission with 7 steps or more has been developed to meet an upgraded specification of a vehicle and a driving request from a driver. Such a transmission with 7 steps is configured to shift to 7th step 40 which is above one step thereof after 5th/6th step 20, 30, in which there may occur a situation where a shift lever is shifted to 7th step from 1st-4th step without passing through 5th/6th step 20, 30 due to an excessive shift operation by a driver, as shown in FIG. 1.

As an example, when shifting to 5th step 20, one step above 4th step 10, while the shift lever 1 is currently disposed on 4th step 10, a driver performs a shift operation to 5th step by moving the shift lever 1 to a shift neutral location 16 from a shift location 13 of 4th step 10 and then up to a shift location 19 of 5th step.

At this time, there may occur a situation in which gears are shifted to a highest speed step from a low speed step by a shift operation where the shift lever is moved to a shift location 43 of 7th step 40 via a shift location 13 of 4th step 10 and a shift neutral location 16 due to an excessive shift manipulation by a driver. Further, a same problem may occur where the shift lever is moved to R step due to an excessive shift operation when shifting gears from 3rd/4th step to 1st step.

As described above, when the shift lever is moved directly to 7th step from 2nd step or 4th step, RPM of an engine is lowered suddenly or cut off due to a sudden shift and gear ratio difference which are not intended by a driver, thereby threatening safety of vehicle passengers.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an apparatus for preventing wrong shift operation of a manual transmission, through which when shifting to a highest step, 7th step, a shift operation to 7th step is allowed to be performed on the condition that the shift operation has been completed at the preceding step, 6th step, thereby preventing direct shifting to a high speed shift step, 7th step from a low speed step of 5th step or 6th step or less.

Various aspects of the present invention are additionally directed to providing an apparatus for preventing wrong shift operation of a manual transmission, through which when shifting to a highest speed step by manipulating a shift lever, it is shifted upward in sequence so that a driver does not confuse the shift steps and operates stably a shift lever.

According to various aspects of the present invention, an apparatus for preventing wrong shift operation of a manual transmission may include a control shaft provided in the transmission, and is connected to a shift lever, the control shaft being moved linearly in an axial direction during a shift operation and rotated during a select operation, a stopper lever linked with the control shaft and rotated together with the control shaft, and a stopper unit arranged on a rotational radius of the stopper lever inside the transmission, and is provided with a plate arranged rotatably in an axial direction of the control shaft such that the stopper lever that is rotated during a select operation for shifting to a highest speed step is caught by the plate to limit rotation of the stopper lever and the plate is rotated by the stopper lever when a shift operation is performed at a shift step preceding the highest speed step to progress the select operation to the highest speed step.

The stopper lever may be arranged to surround the control shaft and a catching portion may be protrudedly formed from the stopper lever, which contacts the stopper unit as the stopper lever is rotated during a select operation.

The highest shift step may be 7th step and the preceding shift step may be 6th step or 5th step.

The stopper unit may further include a bracket arranged on a rotation radius of the stopper lever within the transmission and is provided with a rotation shaft, a plate which is arranged rotatably on the rotation shaft of the bracket and having a contact portion protrudedly formed on the plate, with which the stopper lever that is rotated during a select operation to a highest step is in contact, and an elastic member arranged on the rotation shaft of the bracket and providing elastic recovery force when the plate is rotated.

An end of the contact portion of the plate which the stopper lever contacts may be concaved and surround the contacted stopper lever.

The contact portion of the plate may be tapered such that a width of the contact portion becomes narrower gradually toward the plate from a protruded remote end of the contact portion.

The protrusions may be formed on both sides of the contact portion of the plate forming a select space between each protrusion and the contact portion, respectively.

A fixing portion may be protrudedly formed on the bracket, the elastic member arranged on the rotation shaft may be connected to the fixing portion to be supported by the fixing portion, and the plate may be interposed between the bracket and the elastic member.

A connection portion may be protrudedly formed on the plate on the same line as the fixing portion of the bracket, and the connection portion may be connected to the elastic member to receive elastic recovery force from the elastic member.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
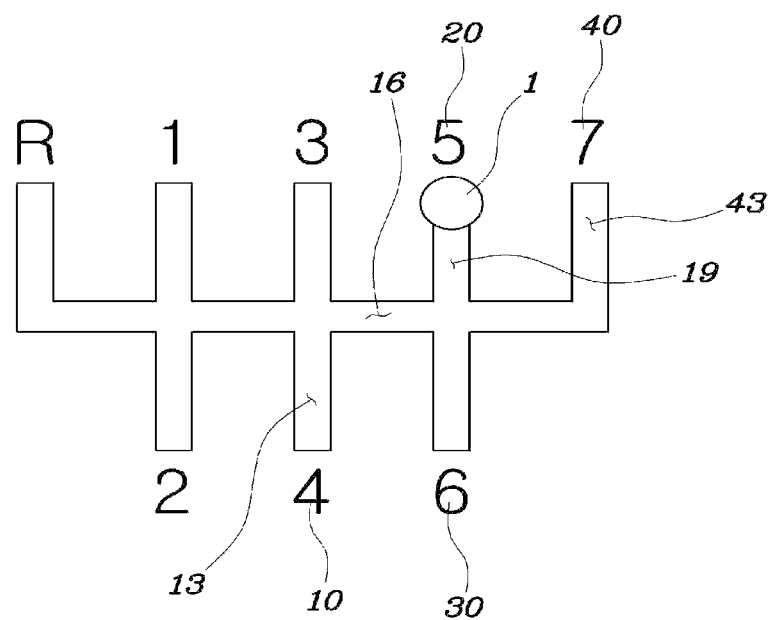
FIG. 1 is a view illustrating a shift manipulation of a manual transmission with 7 speeds according to the related art.
Figure 2:
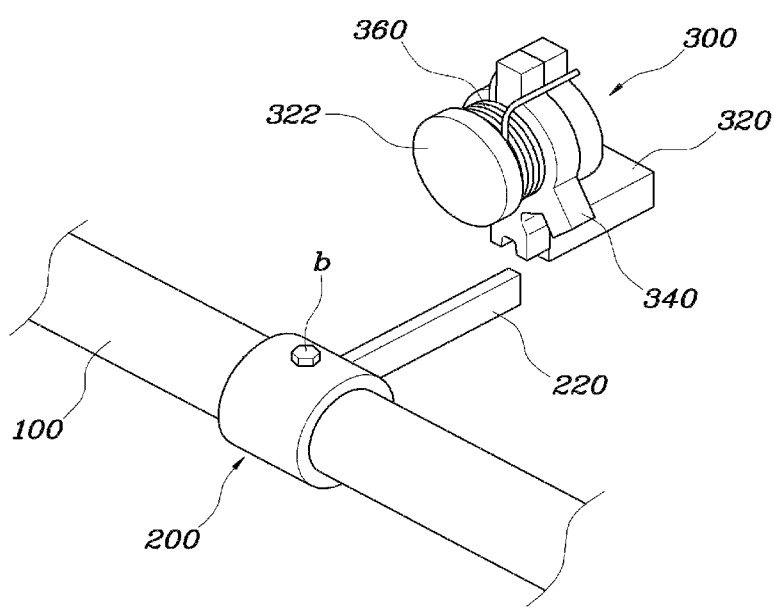
FIG. 2 is a view illustrating an exemplary apparatus for preventing wrong shift operation of a manual transmission according to the present invention.
Figure 3:
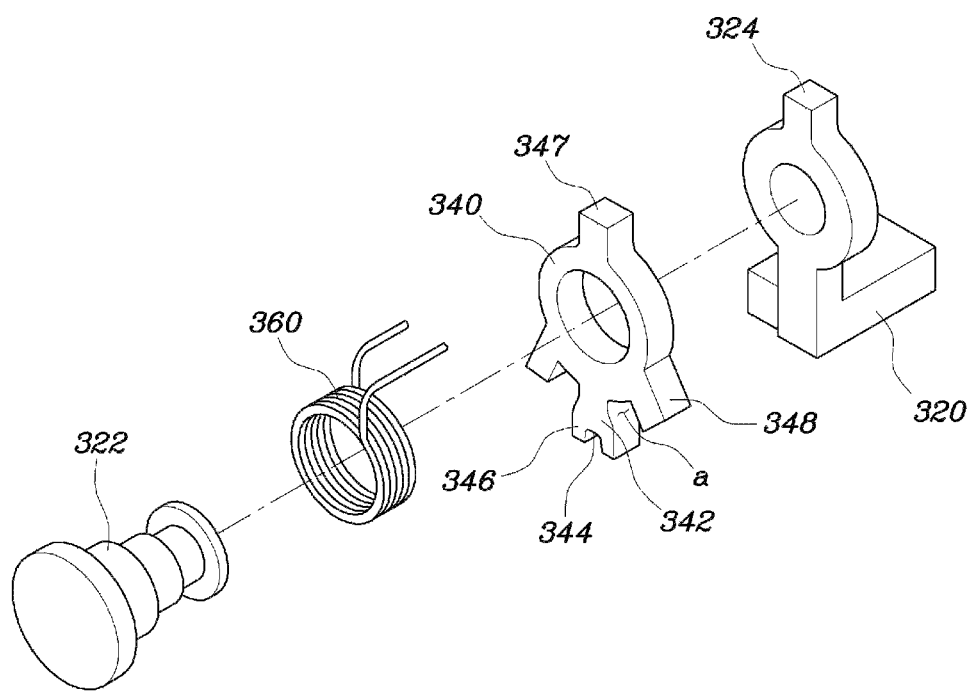
FIG. 3 is a view illustrating a stopper unit of the exemplary apparatus for preventing wrong shift operation of the manual transmission as shown in FIG. 2.

FIG. 1 is a view illustrating a shift manipulation of a manual transmission with 7 speeds, FIG. 2 is a view illustrating an apparatus for preventing wrong shift operation of a manual transmission according to various embodiments of the present invention, FIG. 3 is a view illustrating a stopper unit of the apparatus for preventing wrong shift operation of a manual transmission as shown in FIG. 2, and FIGS. 4 to 7 are views illustrating operational states of the apparatus for preventing wrong shift operation of the manual transmission as shown in FIG. 2.

The present invention relates to a technology to ensure a stable manipulation property in a manual transmission with 7 speeds or more by allowing a driver to shift gears without confusing 5th step or 6th step with 7th step or more when a driver shifts gears through a shift lever. The same configuration as the present invention may be applied even to an apparatus for preventing wrong shift operation with respect to R step, a reverse shift step, that is, confusion between 1st step or 2nd step and R step can be prevented by using the apparatus for preventing an incorrect gear shift of the present invention.

To this end, an apparatus for preventing wrong shift operation of a manual transmission according to various embodiments of the present invention may include a control shaft 100 that is provided in a housing of a transmission, connected to a shift lever to be moved linearly in an axial direction during a shift operation, and rotated during a select operation, a stopper lever 200 that is arranged to be linked with the control shaft 100 and rotated together with the control shaft 100, and a stopper unit 300 that is arranged on a rotational radius of the stopper lever 200 within the housing of a transmission, and is provided with a plate 340 arranged rotatably in an axial direction of the control shaft 100 such that the stopper lever 200 that is rotated during a select operation for shifting to a highest step is caught over the plate 340 and thus its rotation is limited and the plate 340 is rotated by the stopper lever 200 when a shift operation is performed at a shift step preceding the highest step, allowing the select operation to the highest step.

According to various embodiments of the present invention, the control shaft 100 which selects a shift step in accordance with an operation of a shift lever is configured such that it is moved linearly during a shift operation and is rotated during a select operation, wherein it is advantageous to arrange and smoothly operate a stopper lever 200 and a stopper unit 300 which will be described below. Of course, a control shaft that is rotated during a shift operation and moved linearly during a select operation may be applied to the present invention.

A stopper lever 200 may be provided on a control shaft 100 to be linked therewith. The stopper lever 200 is arranged on the control shaft 100 and a catching portion 220 may be formed thereon to be protruded, which contacts the plate 340 of the stopper unit 300 as the stopper lever is rotated during a select operation. Here, the stopper lever 200 is arranged to surround the control shaft 100 and may be connected to the control shaft 100 by using a bolt b to fix it more firmly. Here, the control shaft 100 and the stopper lever 200 may be connected by using various methods such as a spring pin, a bolt, a welding and the like.

As described above, the stopper lever 200 to be connected to the control shaft 100 is moved linearly and rotated identically when operating a shift lever to contact the plate 340 of the stopper unit 300, in which the select and shift operations of the control shaft 100 are limited or allowed through a mechanical operation of the stopper unit 300 during a select and a shift operation.

In a more detailed description of the stopper unit 300, it is arranged to be fixed on a rotation radius of the stopper lever 200 within a housing of a transmission and further may consist of a bracket 320 provided with a rotation shaft 322, a plate 340 which is arranged rotatably on the rotation shaft 322 of the bracket 320 and on which a contact portion 342 with which the stopper lever 200, that is rotated during a select operation to a highest step contacts, is in contact, is formed to be protruded; and an elastic member 360 that is arranged on a rotation shaft of the bracket 320 to provide elastic recovery force when the plate 340 is rotated.

The bracket 320 is arranged on a rotation radius of the stopper lever 200 that is rotated during a select operation in which it may be arranged on a part of the stopper lever where the stopper lever 200 is disposed when the control shaft 100 is moved to the select section of 5th/6th step.

A rotation shaft 322 on which the plate 340 is arranged rotatably is provided on the bracket 320 wherein the plate 340 contacts the stopper lever 200 that is rotated during a select operation to a highest step of 7th step and thus its rotation is limited.

According to various embodiments of the present invention, the plate 340 that is arranged rotatably on the bracket 320 is rotated by the stopper lever 200 and then returned to its original position in order to be ready for a subsequent operation, and to this end the elastic member 360 for returning the rotated plate 340 to its original position is arranged on the bracket 320.

In a simple description of an operation of the stopper unit 300, when the control shaft 100 is rotated to the select section of 5th/6th step for shifting to a highest step, the stopper lever 200 contacts the contact portion 342 of the plate 340 thereby to limit the select operation to a highest step of 7th step.

Under this state when a shift operation to 5th step or 6th step is performed, the stopper lever 200 is moved linearly in an axial direction of the control shaft 100 and pushes the contact portion 342 to rotate the plate 340 in an axial direction. As described above, the plate 340 of the stopper unit 300 is rotated as the stopper lever 200 is moved, and the stopper lever 200 is rotated-moved to a predetermined distance or more to be separated from the plate 340. At this time, the plate 340 is returned to its original position with elastic recovery force of the elastic member 360.

After that, when the stopper lever 200 is returned to a neutral position through a select operation, the stopper lever 200 contacts a side of the contact portion 342 of the plate 340 to rotate the plate 340 where the stopper lever 200 may be rotatable in an additional select direction by a gap space a at a side of the contact portion 342. At this time the stopper lever 200 is rotated to the gap space a and then a shift progresses thereby to shift a highest step of 7th step.

In a more detailed description of the components of the stopper unit 300, a concave portion 344 may be formed on an end of the contact portion 342 of the plate 340, which the stopper lever 200 contacts, to surround the contacted stopper lever 200.

As described above, the plate 340 is rotated in an axial direction of the control shaft 100 as a shift operation is performed while the rotated stopper lever 200 contacts the contact portion 342 of the plate 340.

To this end the concave portion 344 may be formed on an end of the contact portion 342 such that the rotated stopper lever 200 is to be caught over the contact portion 342 of the plate 340 so that the plate 340 is rotated smoothly when the stopper lever 200 is moved linearly.

Here, the concave portion 344 and both ends 346 of the concave portion 344 on the contact portion 342 may be curved such that the stopper lever 200 that contacts the contact portion 342 is moved smoothly during a shift operation.

Meanwhile, protrusions 348 may be formed on both sides of the contact portion 342 of the plate 340 such that select space a is formed between the protrusions 348 and the contact portion 342, respectively.

As described above, the protrusions 348 are formed on both sides around the contact portion 342 such that the stopper lever 200 is rotated to one select space a between the contact portion 342 and the protrusion 348 when allowing a select operation to a highest step, thereby shifting to the highest step.

Further, the stopper lever 200 is supported between the contact portion 342 and the protrusion 348 while the stopper lever 200 is disposed at a side of the contact portion 342 of the plate 340 as a select operation of the stopper lever 200 to a highest step is allowed, thereby allowing a stable operation thereof.

Meanwhile, the contact portion 342 of the plate 340 may be tapered toward the plate 340 from the protruded remote end thereof in which the contact portion 342 width becomes narrower gradually toward the plate 340. As described above, both sides of the contact portion 342 are tapered such that the stopper lever 200 may contact a side of the contact portion 342 and may be seated thereon during a shift operation to a highest step while the stopper lever 200 is disposed at a side of the contact portion 342 when allowing a select operation to a highest step.

Meanwhile, a fixing portion 324 may be formed on the bracket 320 to be protruded, the elastic member 360 that is arranged on the rotation shaft may be connected to the fixing portion 324 to be supported thereto, and the plate 340 may be interposed between the bracket 320 and the elastic member 360. Here, a connection portion 347 may be formed on the plate 340 on the same line as the fixing portion 324 of the bracket 320 to be protruded and the connection portion 347 is connected to the elastic member 360 to receive elastic recovery force therefrom.

Here, the fixing portion 324 formed on the bracket 320 is formed on an opposite side to a part which the stopper lever 200 contacts such that the fixing portion 324 is not to interfere with the stopper lever 200 that is rotated during a select operation. The elastic member 360 is arranged on the rotation shaft 322 of the bracket 320 and is connected to the fixing portion 324 to be supported thereto, and the connection portion 347 of the plate 340 interposed between the elastic member 360 and the bracket 320 contacts the elastic member 360 to receive elastic recovery force therefrom.

Figure 4:
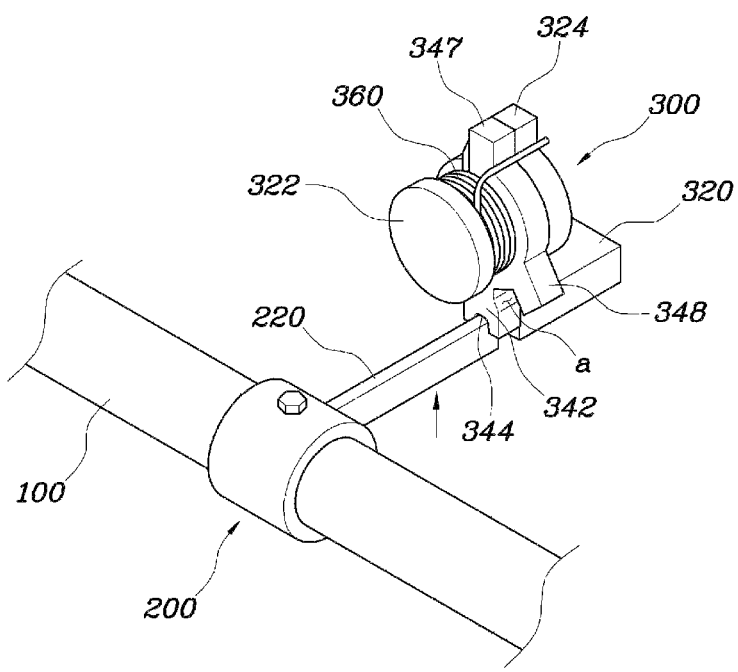
FIG. 4, FIG. 5, FIG. 6 and FIG. 7 are views illustrating operational states of the exemplary apparatus for preventing wrong shift operation of the manual transmission as shown in FIG. 2.

Describing the operations as above, referring to FIG. 4, when the control shaft 100 of a shift lever is rotated to a select section of 5th/6th step, the catching portion 220 of the stopper lever 200 contacts the contact portion 342 formed on the plate 340 of the stopper unit 300 to be protruded, thereby limiting a select operation to a highest step of 7th step, as shown in FIG. 4.

Figure 5:
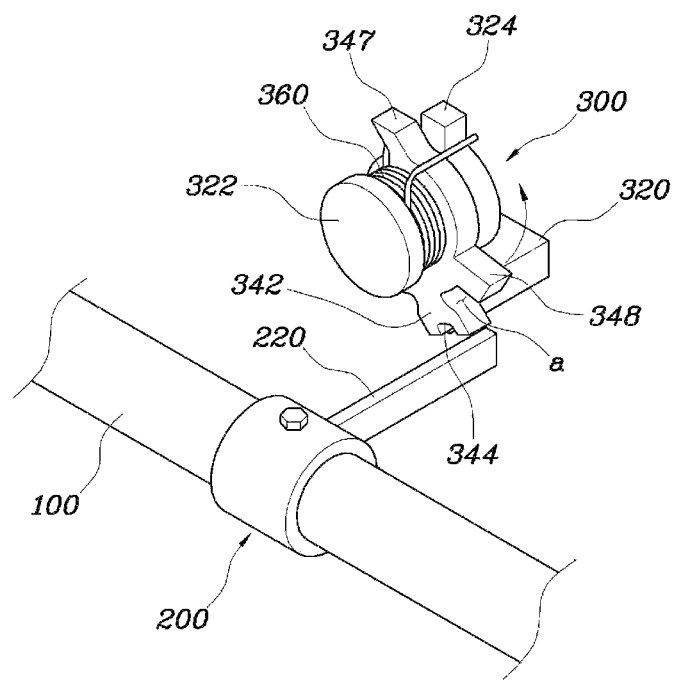
Figure 6:
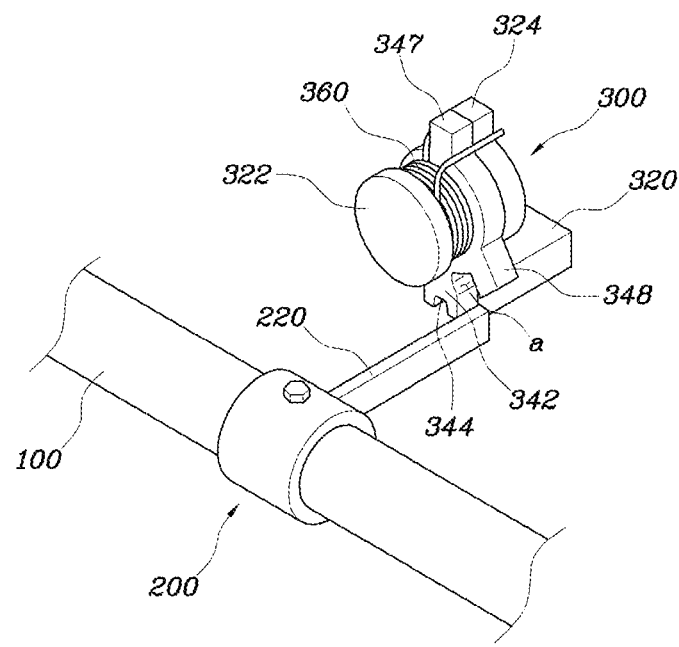

Under this state when a shift operation to 5th step or 6th step preceding the highest step is performed, as shown in FIG. 5, the stopper lever 200 is moved while pushing the concave portion 344 of the contact portion 342 that is formed on the plate 340 to be protruded. At this time, the plate 340 is rotated in a movement direction of the stopper lever 200 around the rotation shaft 322 of the bracket 320, and when a shift operation is completed, as shown in FIG. 6, the stopper lever 200 is separated from the contact portion 344 of the plate 340 and the plate 340 is returned to its original position by elastic recovery force of the elastic member 360 arranged on the bracket 320.

As a result, the stopper lever 200 is to be disposed at the select space a between the contact portion 342 and the catching portion 348 of the plate 340 and thus the stopper lever 200 is rotatable to the select space a, thereby allowing a select to a highest step of 7th step.

Figure 7:
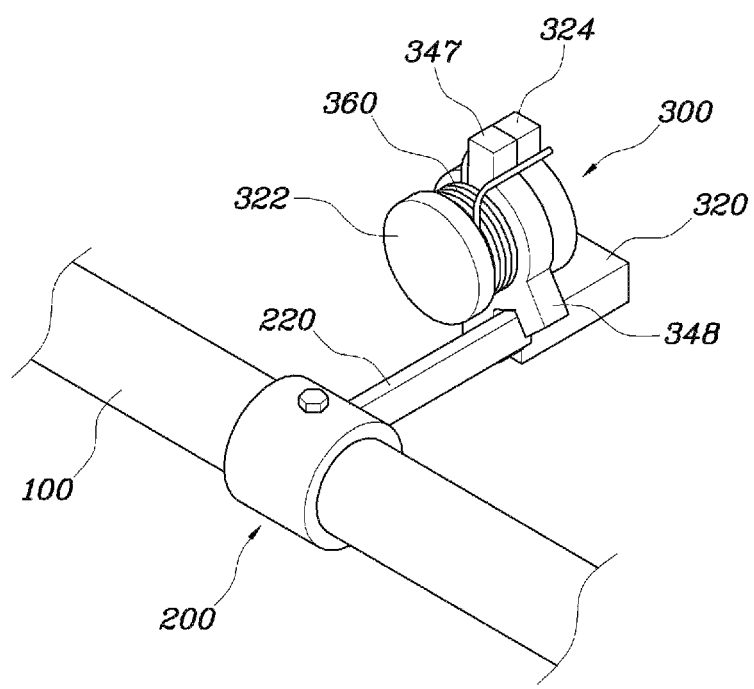

Under this state, as shown in FIG. 7, the stopper lever 200 is rotated to a gap space a and inserted therein through a select operation to 7th step and when the select operation to 7th step is completed, it is shifted to a highest step of 7th step through a shift operation.

According to an apparatus for preventing wrong shift operation of a manual transmission configured as described above, when shifting to a highest step of 7th step, it can be shifted to 7th step on the condition that the shift operation at the shift step of 5th or 6th step preceding 7th step has to be completed through a stopper unit, thereby preventing directly shifting to a high speed shift step of 7th step from a low speed step of 5th step or 6th step or less.

Further, when shifting to a highest speed step by manipulating a shift lever, it is shifted upward in sequence so that a driver does not confuse the shift steps and operates stably a shift lever.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for preventing wrong shift operation of a manual transmission, comprising:
    a control shaft provided in a housing of the transmission and connected to a shift lever, the control shaft being moved linearly in an axial direction during a shift operation and rotated during a select operation;
    a stopper lever linked with the control shaft and rotated together with the control shaft; and
    a stopper unit arranged on a rotational radius of the stopper lever inside the transmission, and provided with a plate arranged rotatably in an axial direction of the control shaft such that the stopper lever that is rotated during a select operation for shifting to a highest speed step is caught by the plate to limit rotation of the stopper lever and the plate is rotated by the stopper lever when a shift operation is performed at a shift step preceding the highest speed step to progress the select operation to the highest speed step,
    wherein the stopper unit further includes:
        a bracket that arranged on a rotation radius of the stopper lever within the transmission and provided with a rotation shaft;
        the plate arranged rotatably on the rotation shaft of the bracket and having a contact portion, protrudedly formed on the plate, with which the stopper lever that is rotated during the select operation to a highest step is in contact; and
        an elastic member arranged on the rotation shaft of the bracket and providing elastic recovery force when the plate is rotated, and
    wherein an end of the contact portion of the plate which the stopper lever contacts, is concaved to form first and second ends and surrounds the contacted stopper lever within the first end and the second end of the contact portion.

2. The apparatus for preventing wrong shift operation of the manual transmission of claim 1, wherein the stopper lever is arranged to surround the control shaft and a catching portion is protrudedly formed from the stopper lever, which contacts the stopper unit as the stopper lever is rotated during a select operation.

3. The apparatus for preventing wrong shift operation of the manual transmission of claim 1, wherein the highest shift step is 7th step and the preceding shift step is 6th step or 5th step.

4. The apparatus for preventing wrong shift operation of a manual transmission of claim 1, wherein the contact portion of the plate is tapered such that a width of the contact portion becomes narrower gradually toward the plate from a protruded remote end of the contact portion.

5. The apparatus for preventing wrong shift operation of a manual transmission of claim 1, wherein protrusions are formed on both sides of the contact portion of the plate forming a select space between each protrusion and the contact portion, respectively.

6. The apparatus for preventing wrong shift operation of a manual transmission of claim 1, wherein a fixing portion is protrudedly formed on the bracket, the elastic member arranged on the rotation shaft is connected to the fixing portion to be supported by the fixing portion, and the plate is interposed between the bracket and the elastic member.

7. The apparatus for preventing wrong shift operation of a manual transmission of claim 6, wherein a connection portion is protrudedly formed on the plate on the same line as the fixing portion of the bracket, and the connection portion is connected to the elastic member to receive elastic recovery force from the elastic member.

* * * * *